Figure 1:
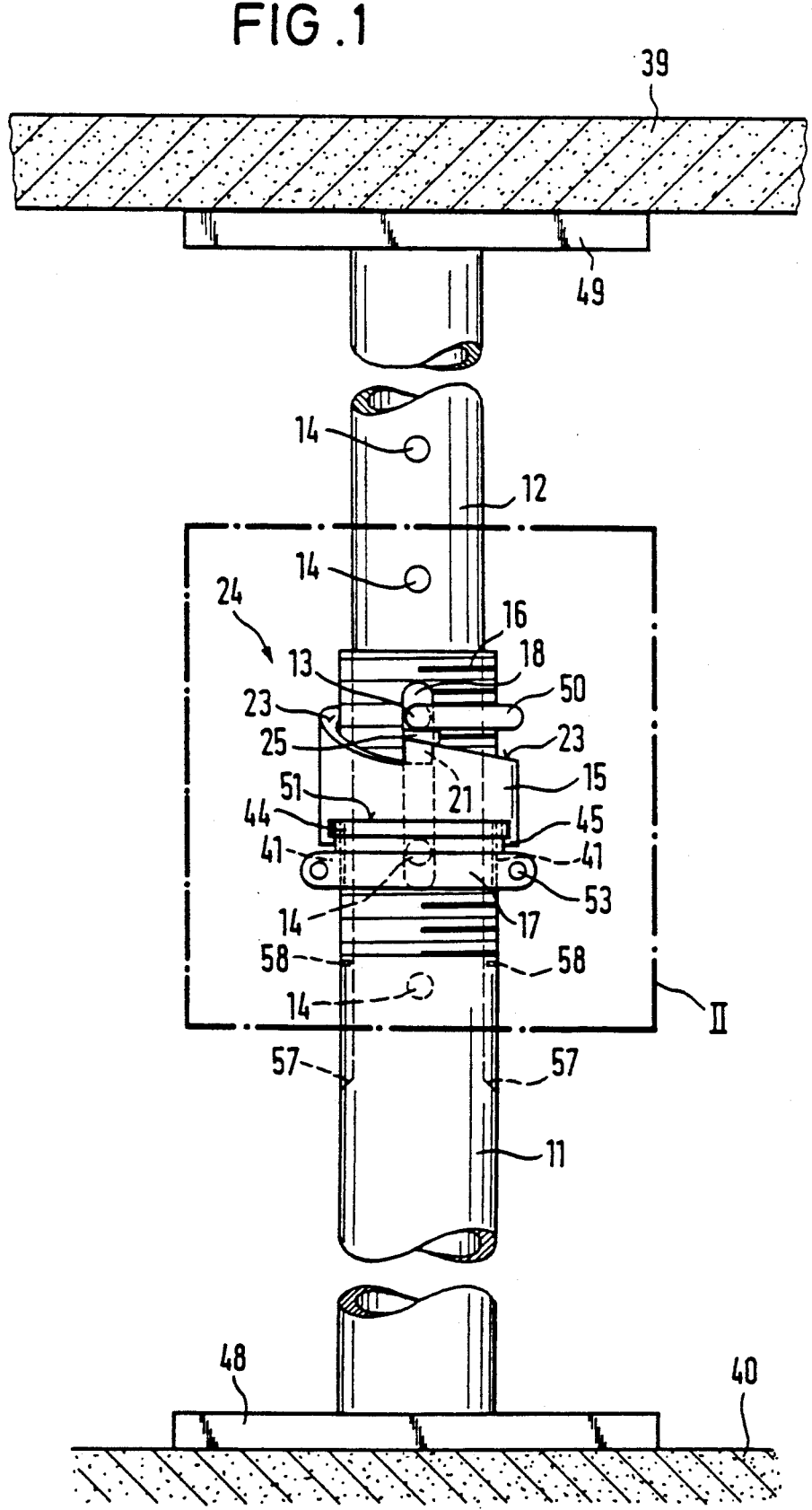

United States Patent [19]

Schwörer

[11] Patent Number: 5,060,903
[45] Date of Patent: Oct. 29, 1991

[54] TELESCOPIC SHUTTERING SUPPORT

[75] Inventor: Artur Schwörer, Senden, Fed. Rep. of Germany

[73] Assignee: Peri GmbH, Weissenhorn, Fed. Rep. of Germany

[21] Appl. No.: 497,390

[22] Filed: Mar. 22, 1990

[30] Foreign Application Priority Data

Mar. 30, 1989 [DE] Fed. Rep. of Germany ....... 3910344

[51] Int. Cl.$^5$ ............................................... A47F 5/00
[52] U.S. Cl. ............................ 248/354.3; 248/354.4; 248/161; 108/144; 403/109
[58] Field of Search ............ 248/157, 161, 188.4, 248/649, 650, 354.3–354.5, 511; 403/109, 116, 117, 376–378; 108/144, 150

[56] References Cited

U.S. PATENT DOCUMENTS

| | | | |
|---|---|---|---|
| 994,598 | 6/1911 | Martin | 248/157 |
| 2,302,237 | 11/1942 | McFall | 248/161 |
| 3,266,840 | 8/1966 | D'Estrube | 108/144 X |
| 3,516,200 | 6/1970 | Marin | 248/354.5 X |
| 3,870,268 | 3/1975 | Larkin | 248/254.4 X |
| 3,887,155 | 6/1975 | Bertalot | 108/144 X |
| 4,318,352 | 3/1982 | Friedman et al. | 108/144 X |
| 4,419,026 | 12/1983 | Leto | 403/109 X |
| 4,589,622 | 5/1986 | Hutter | 248/354.4 X |
| 4,627,543 | 12/1986 | Nicely | 108/144 X |
| 4,752,057 | 6/1988 | Hagemes | 248/354.3 |

*Primary Examiner*—Gary L. Smith
*Assistant Examiner*—Suzanne L. Dino
*Attorney, Agent, or Firm*—Townsend and Townsend

[57] ABSTRACT

A telescopic support 14 of variable length has an outer tube tube 11 and an inner tube 12 which is telescopically displaceable therein. A shallow external thread 16 is provided at one end of the outer tube 11 onto which there is screwed a positioning nut 17 with a lowering sleeve 14 rotatably secured thereto. In the region of the thread 16 there is at least one elongate slot 18 in the outer tube into which a latch bolt 13 engages which is supported axially on the lowering sleeve 15. In accordance with the invention the lowering sleeve 15 can be rotationally locked in both directions in the extended position by a rotary latch 21 which engages in the elongate slot 18.

33 Claims, 8 Drawing Sheets

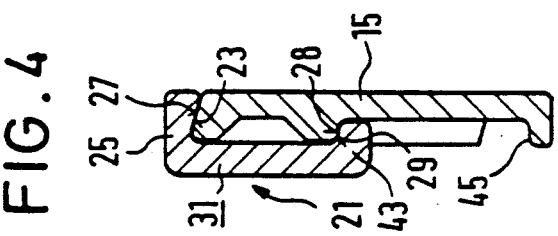
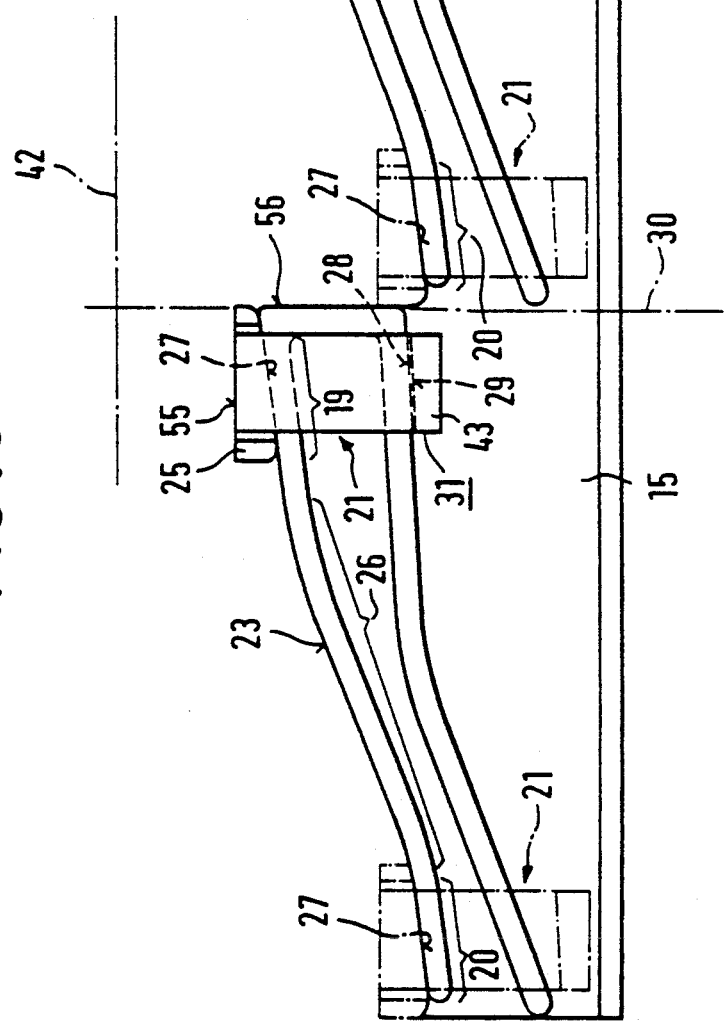

TELESCOPIC SHUTTERING SUPPORT

The invention relates to a telescopic support in accordance with the preamble of claim 1 which is adjustable in length and which is loadable under compression, in particular a telescopic support such as is used to support shuttering, such as deck shuttering, from a firm support surface, such as the floor. On rotating the support sleeve a rapid lowering of the extended telescopic support is possible, is not however attainable with the positioning nut due to the shallow thread and the self-locking which thereby arises.

Known telescopic supports of this kind (German OS 26 20 668, German AS 29 333 510 and German Gbm 82 32 446) are initially approximately drawn out to the length required to hold a specific deck shuttering by drawing the inner tube out of the outer tube, whereupon the locking bolt is pushed through the elongate slot into the recess provided for it in the inner tube. The locking bolt is thereby braced on the upper edge of the lowering sleeve. The lowering sleeve can now be displaced by rotation of the adjusting nut until the telescopic support has achieved the required length. The telescopic support is then ready to hold shuttering which is to be arranged at a specific distance from the floor.

In a telescopic support of the initially named kind (German Gbm 82 32 446) the lowering sleeve is rotationally locked in the extended position in which the latch bolt contacts the extended support region, by a peripheral abutment which results in rotary locking in that direction in which the positioning nut has to be turned for the further extension of the telescopic support. The latch bolt thereby contacts the relevant peripheral abutment and prevents the lowering sleeve being turned on turning the positioning nut in the extension direction. The disadvantage of this arrangement is the fact that on turning the positioning nut in the opposite direction the lowering sleeve can be taken along with the positioning nut, whereby the latch bolt can side away from the extended support region of the support surface and can slide into the support region for lowering. A reverse turning of the positioning nut of this kind can for example be necessary when the positioning nut is first screwed too far in the extension direction and then has to be screwed back again by a small amount. The sudden and undesired backward slippage of the latch bolt from the extended support region into the lowered support region not only brings about a danger of injury for the operator, but also requires renewed turning of the lowering sleeve so that the latch bolt is again located on the extended support region of the lowering sleeve.

The object of the present invention is to provide a telescopic support of the initially named kind and of variable length which, with minimal constructional complexity, ensures problem free rotary locking of the lowering sleeve in the extended position.

The features of the characterizing part of claim 1 are provided in order to satisfy this object.

The concept underlying the invention is thus to be seen in the fact that the lowering sleeve is rotationally secured in the rotary extended position in both directions of rotation, so that the positioning nut can be turned both in the extension direction and also in the lowering direction without the danger that the relative position between the lowering sleeve and the latch bolt changes. The telescopic support can thus be adjusted in ideal manner to the correct length and there is no danger that the support will be undesirably lowered and must thus be newly adjusted.

Although further elongate slots for receiving the rotary latch or latches can be provided parallel to the elongate slots provided for the latch bolts it is however preferable when the elongate slots which already accommodate the latch bolt also accommodate the rotary latch or rotary latches above it or preferably beneath it. One and the same elongate slot is thus exploited twice to accommodate both the latch bolt and the rotary lock. They only need to be extended somewhat by the longitudinal extent of the rotary latch.

In the simplest case the rotary latch of the invention can be inserted radially from the outside into the elongate slot or into the elongate slots in the extended position of the lowering sleeve. If the lowering sleeve is then later turned into the lowering position then the rotary latch is previously removed from the elongate slot so that the lowering sleeve can be turned again relative to the outer tube or relative to the latch bolt. In this way the rapid lowering movement can be executed without problem.

In this simplest embodiment of a rotary latch in accordance with the invention the rotary latch could for example be biased by a spring towards the outer tube and provided in a radial bore of the lowering sleeve. The rotary latch would then automatically snap into the elongate slot when aligned therewith, and could for example be drawn again by a suitable handle out of the elongate slot for the purpose of rotating the lowering sleeve.

Preferred is however the embodiment of claims 2 and 3 in which the rotary latch or latches remain continuously in engagement with the elongate slot, with the rotation of the lowering sleeve around the tube axis being made possible by a suitable rotationally movable support of the rotary latch on the lowering sleeve. By executing hammer-blows onto the lowering sleeve in the peripheral direction the required jamming or clamping of the rotary latch in the extended position can be executed, with the latching of the rotary latch in the elongate slot making the relative displacement of the lowering sleeve and the rotary latch possible under the action of the hammer-blows executed in the peripheral direction.

The development of claim 4 is particularly advantageous since in this way the entire lowering movement of the telescopic support required for the purpose of dismantling the shuttering is executed by rotation of the lowering sleeve which has a screw track support surface of correspondingly large steepness. In this manner it is not necessary to turn back the positioning nut after the rapid lowering movement.

The subdivision of the support surface into two screw regions which each extend over a range of approximately 180 degrees is particularly advantageous.

In the advantageous embodiment of the invention of claim 6 the rotary latch not only serves to rotationally lock the lowering sleeve in the extended position but rather at the same time also as a mechanical intermediate member between the latch bolt or latch bolts and the screw-like support surface of the lowering sleeve. The support surface of the support part is thereby advantageously made flat and extends perpendicular to the tube axis so that the latch bolt lies on a flat surface. The slide surface of the support part which engages the support surface is in contrast of somewhat inclined shape in accordance with the screw-like support surface and represents the actual slide surface between the latch bolt and the lowering sleeve. This slide surface can be comparatively long in the peripheral direction and thus ensures particularly favorable and well defined sliding characteristics.

The embodiment of claims 7 and 8 ensures that even in the case when the clamping between the rotary latch and the lowering sleeve is not sufficient in the extended position an automatic turning of the lowering sleeve under the load of the inner tube is effectively avoided. Outside of the extended rotary position there is however no longer any self-locking so that after releasing the clamping and overcoming the self-locking, for example by hammer-blows executed in the peripheral direction onto corresponding projections of the lowering sleeve the latter automatically passes into the lower position. The screw track should however not be so steep that it leads to accelerations which are too rapid and to jolts on sliding of the support part on the support surface of the lowering sleeve.

Through the formation of claim 9 the clamping of the rotary latch in the extended position of the lowering sleeve is realized in a particularly advantageous manner.

Advantageous dimensions for the inclinations of the individual surfaces are to be found in claims 10 to 12.

In accordance with claim 13 the rotary latch can be U-shaped and engage around corresponding projections and surfaces of the lowering sleeve from the inside.

In accordance with claim 14 the rotary latch can however also be arranged in a groove-like recess in the inner jacket surface of the lowering sleeve.

The combination of the latch bolt with the rotary latch in accordance with claims 15 and 16 is particularly advantageous. In this way a latch bolt is no longer required as a separate and loosable component.

Through the embodiment of claim 17 the movement of the rotary latch in the axial direction is also restricted in the direction away from the support surface and indeed along its entire peripheral movement.

With an integration of the latch bolt and the rotary latch the problem exists of separating the areas of the lowering movement of the lowering sleeve and the bringing of the latch bolt out of engagement with the carrier recesses of the inner tube in an axial direction. The further development of claim 18 is provided in order to effect the separation in particularly effective manner.

The embodiment of claim 19 is particularly advantageous in this respect since it cannot unintentionally lead to a transition from the lowering region to the release region during the rotary movement of the lowering sleeve . The rotation of the lowering sleeve in the rising region namely requires, in contrast to the preceding lowering region, the application of torques or lifting forces, whereby the operator is made aware of the impending separation of the latch bolt from the inner tube. It is simplest if the lowering sleeve is turned in this region and if the inner tube is simultaneously lifted so that the latch bolt is relieved for the purpose of easier separation from the inner tube.

The abutment step of claim 20 likewise contributes to ensuring that no unintentional transition takes place from the lowering region into the latch bolt release region.

Claims 21 and 22 characterize a particularly advantageous practical embodiment for bringing the latch bolt out of engagement with the inner tube.

In so far as the latch bolt is not a bolt which extends transversely through the entire inner tube, but rather simply a stub bolt arranged on the rotary latch, no through going transverse bores need to be arranged in the inner tube. On the contrary it is already sufficient to use latch depressions in accordance with claim 23. In this way the weakening of the inner tube by the carrier cut-outs is reduced to a minimum. The penetration of moisture into the interior of the tube can thus be avoided.

Figure 2:
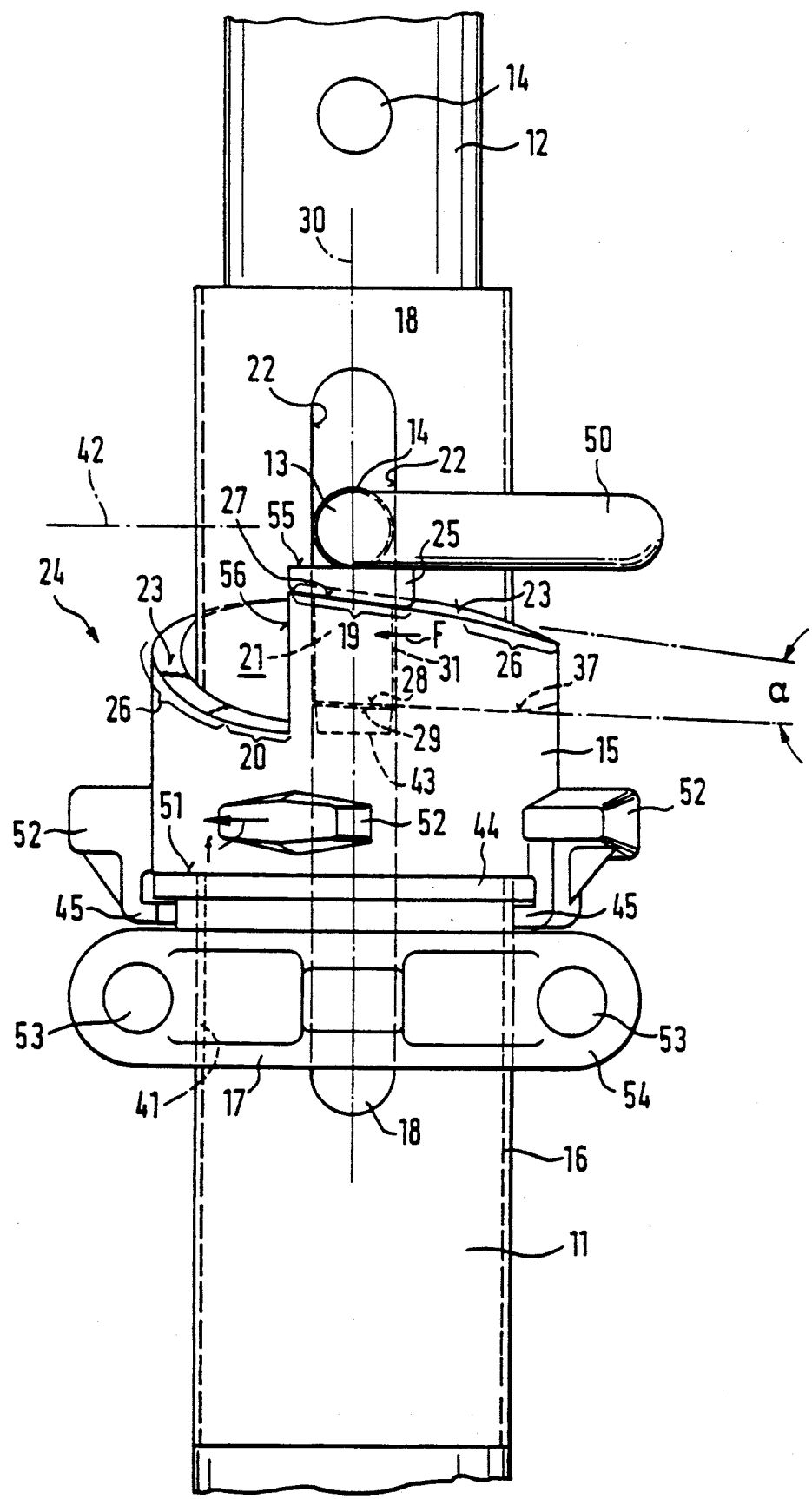
Figure 5:
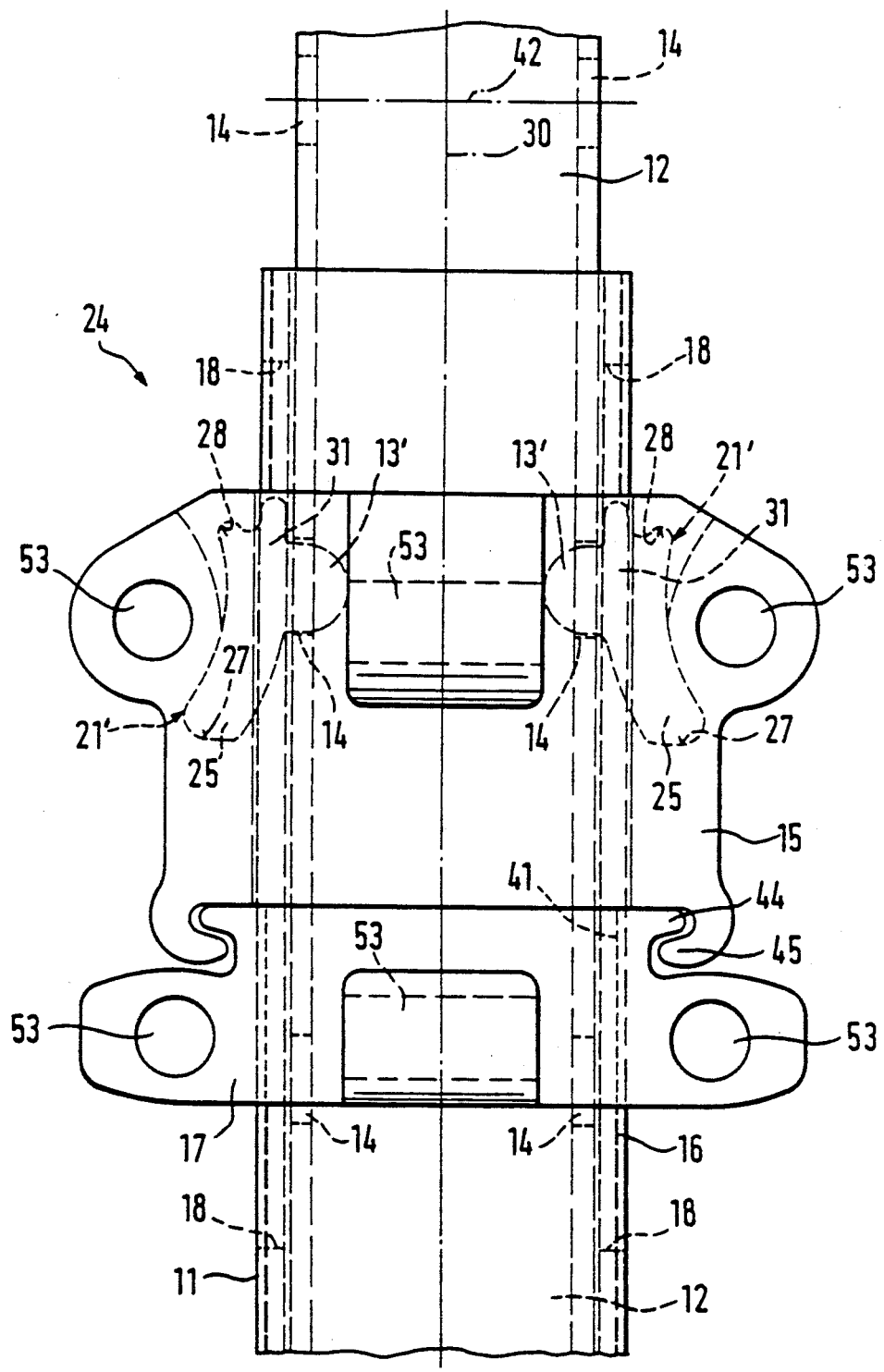
Figure 6:
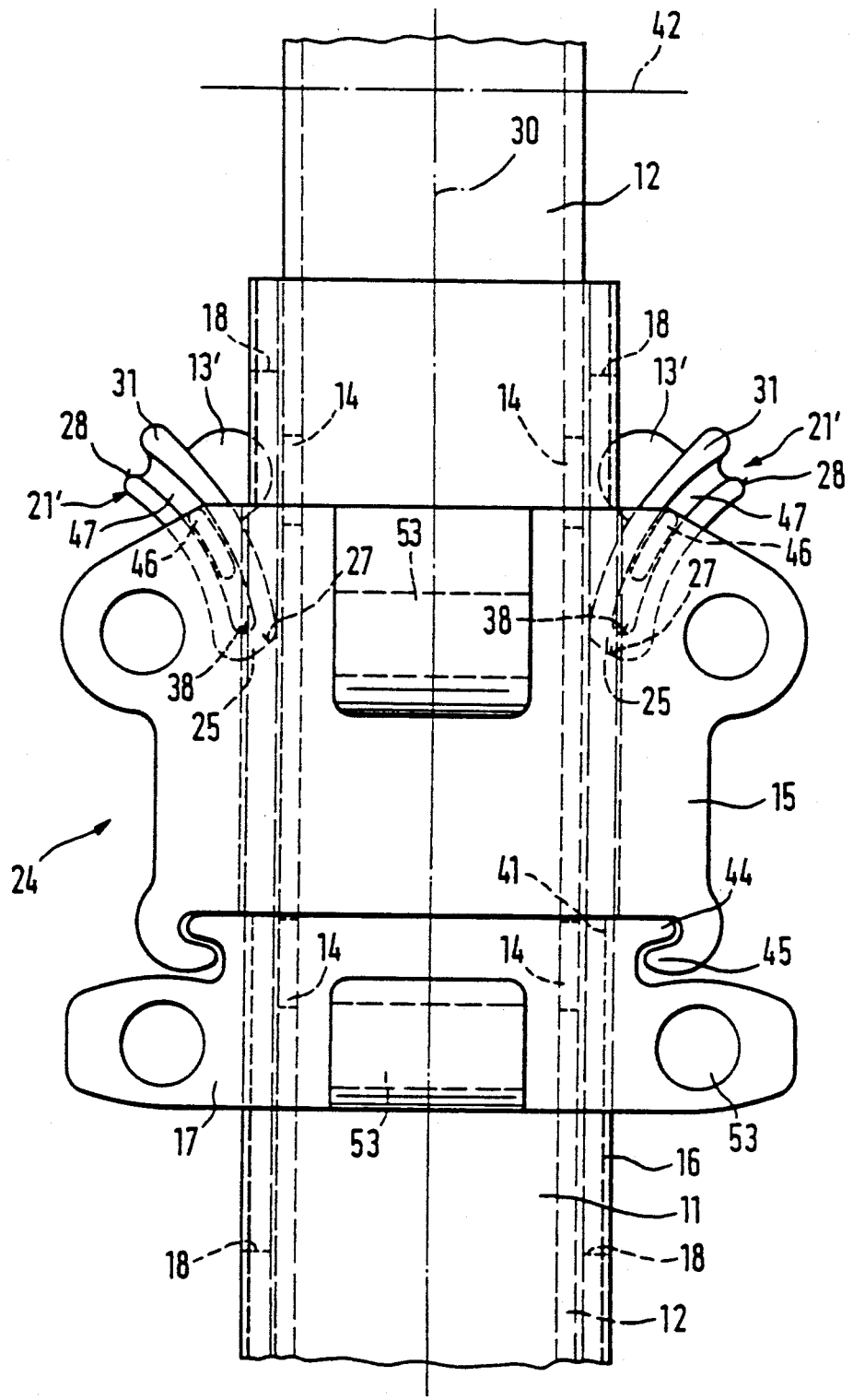
Figure 7:
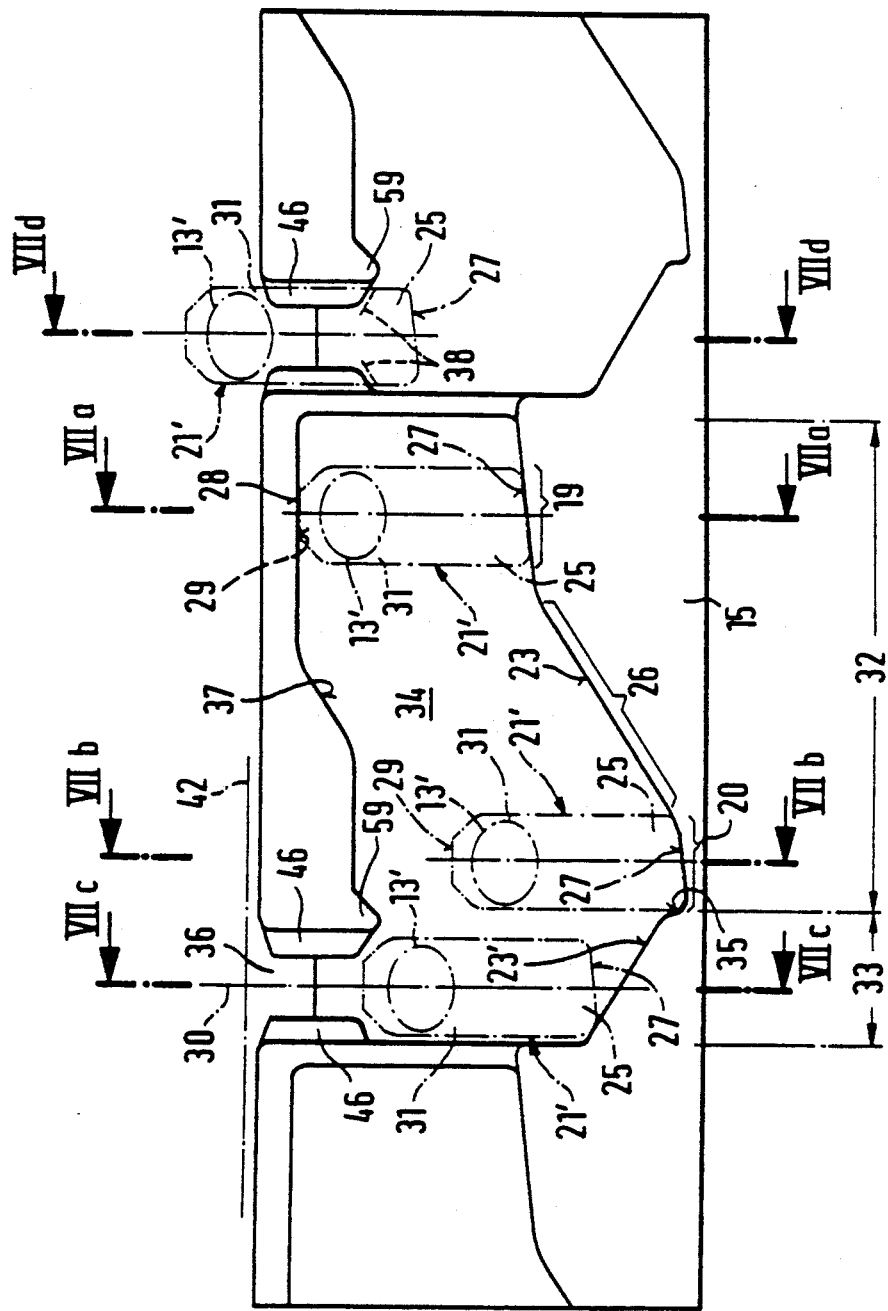
Figure 7A:
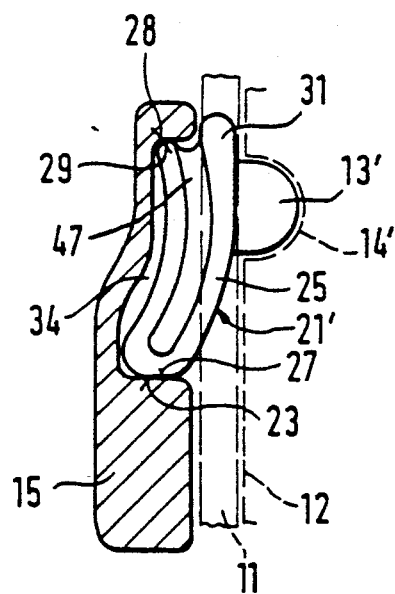
Figure 7B:
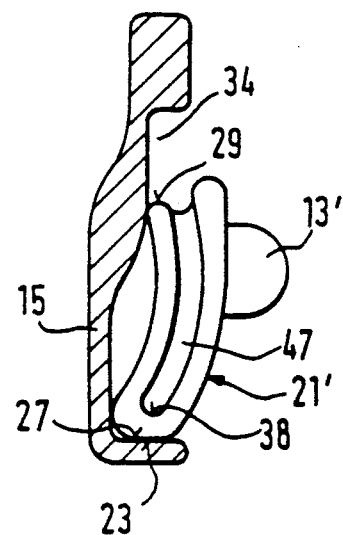
Figure 7C:
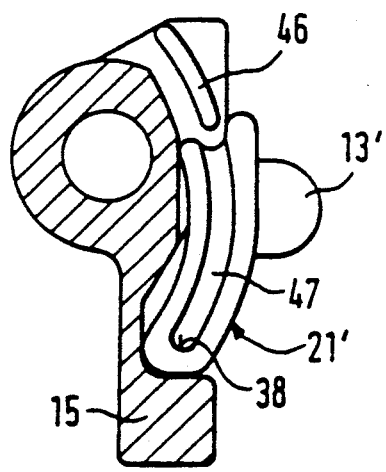
Figure 7D:
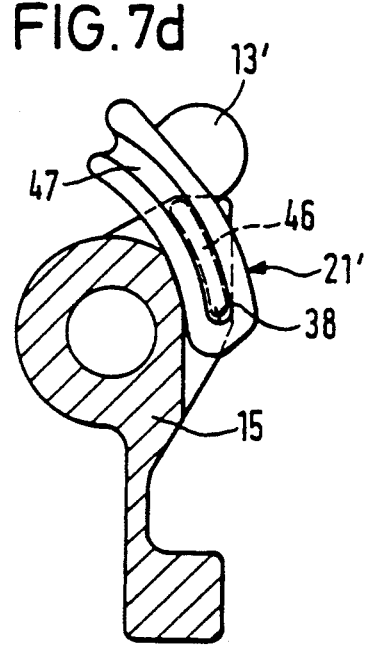
Figure 8:
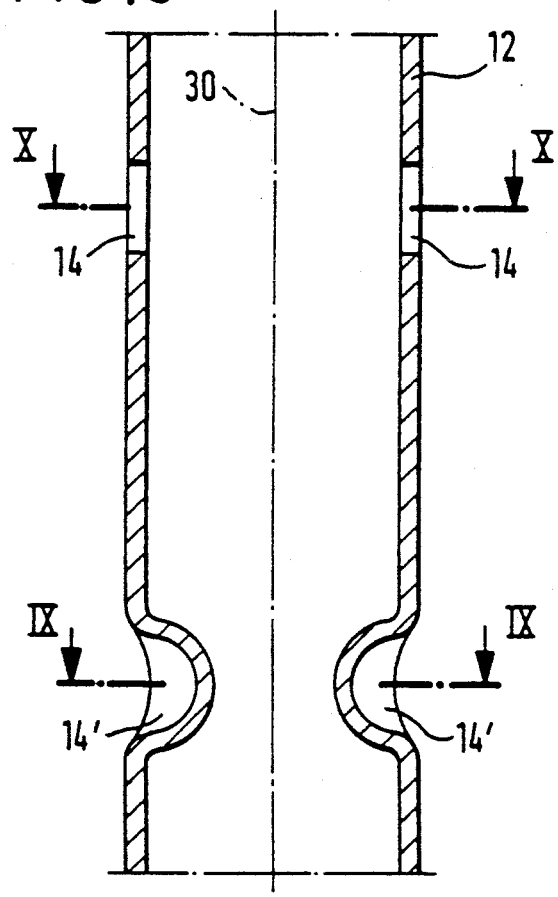
Figure 9:
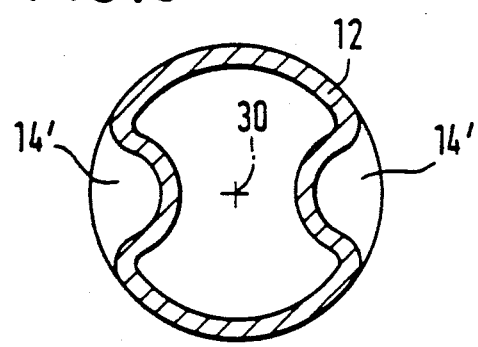
Figure 10:
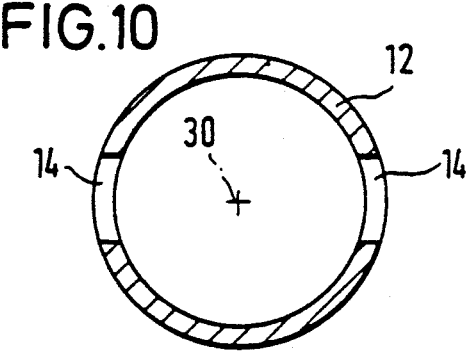

The invention will be described in the following by way of example and with reference to the drawings in which are shown:

FIG. 1 a partly sectioned schematic side view of a telescopic support in accordance with the invention which is arranged between deck shuttering and a floor support surface, FIG. 2 an enlarged detail view of the region II in FIG. 1, FIG. 3 a radially inner view of the lowering sleeve 15 of FIGS. 1 and 2 in a straightened out form in the plane of FIG. 3, FIG. 4 a section on the line IV—IV in FIG. 3, FIG. 5 a side view analagous to FIG. 2 of a further embodiment of a telescopic support in accordance with the invention, with this view however being turned through 90 degrees about the tube axis 30 relative to FIG. 2, FIG. 6 a corresponding view to FIG. 5, however showing the rotary latch with the latch bolt integrated therein in the out of engagement position, FIG. 7 a radially inner view of the lowering sleeve of the embodiment of FIGS. 5 and 6 in the unwound form in the plane of FIG. 7, with the rotary latches being reproduced with the latch bolts integrated therein in four different angular positions VIIa, VIIb, VIIc and VIId, FIGS. 7a, 7b, 7c, 7d sections on the line VIIa—VIIa, VIIb-VIIb, VIIc-VIIc and VIId-VIId in FIG. 7, FIG. 8 is a partly sectioned view of the inner tube of the telescope support of the invention with two different embodiments of the carrier cut-outs, FIG. 9 a section on the line IX—IX in FIG. 8 and FIG. 10 a section on the line X—X in FIG. 8

As seen in FIG. 1 a telescope support 24 in accordance with the invention is arranged between a flat support surface 40 formed by the floor and shuttering 39 for a deck which is only schematically illustrated. The telescope support comprises an outer tube 11 with a floor plate 48 at the lower end and an inner tube 12 which is axially displaceable therein, with the inner tube having a deck plate or ceiling plate 49 arranged at the top thereof.

As seen in FIGS. 1 and 2 the inner tube 12 which is inserted from above into the outer tube 11 is braced on the outer tube 11 in that a latch bolt 13 is pushed transverse to the tube axis 30 through two axially directed elongate slots 18 region outer tube 11 and through carrier the upper of the a cut-out 14 of the inner tube 12 which is formed as a through going bore and extends transverse to the central axis 30, with the latch bolt being formed as a throughgoing bolt with an angled actuating portion 50.

The regions of the latch bolt 13 which project out of the elongate slots 18 are supported on support parts 25 of rotary latches 21 which in turn contact pivotal track-like support surfaces 23 which extend around the central axis 30 through 180 degrees and are formed on a lowering sleeve 15 which surrounds the upper end of the outer tube 11. The lowering sleeve 15 is in turn rotatable at 51 on a positioning nut 17 which has an inner thread 41 and which is screwed onto the upper end of the outer tube 11, which is provided with an outer thread 16. As can be seen from FIG. 1 the outer thread 16 and the inner thread 41 are of relatively shallow construction so that a fine vertical adjustment of the telescope support 24 can take place by turning the positioning nut 17 in the one or other direction.

Axial holding abutments 45 engage from diametrically opposite sides at the lower end of the lowering sleeve 15 and from below around a peripheral flange 44 at the top end of the positioning nut 17 so that the lowering sleeve 15 and the positioning nut 17 are rotatable relative to the central axis 30 but are however substantially undisplaceably connected relative to one another in the axial direction. The fact that the axial holding abutments 45 are only provided at diametrically opposite sides of the lowering sleeve 15 means that the lowering sleeve 15 can be brought axially into engagement or out of engagement with the positioning nut 17 by pushing it transverse to the central axis 30 when both parts are removed from the tubes 11, 12 or the positioning nut 17 is brought into a position such that the surface 51 lies the above the threaded region 16 of the outer tube 11.

Radial actuating projections 52 project from the circumference of the lowering sleeve 15 and suitable turning moments can be transmitted via the radial actuating projections onto the lowering sleeve 15 by means of hammer-blows exerted in the peripheral direction. For the turning of the positioning nut 17 actuating bores 53 are provided in lug-like projections 54 and a bar-like tool can be introduced into the actuating bores in order to provide a suitably long lever arm.

In accordance with the invention the lowering sleeve 15 has at its end edge confronting the lock bolt 13 two diametrically oppositely disposed support surfaces 23 which each drop away helically over approximately 180 degrees. These support surfaces 23 have at the start an extended support region 19 which ensures the furthest extended position of the inner tube 12 and at the end a lowered support region 20 which ensures the lowermost position of the inner tube 12. Between the start and the end there is located a region 21 which continuously drops away helically.

The support part 25 for the rotary latch 21 has a flat upper surface 55 and also a lower slide surface 27 which is in sliding engagement with the support surface 23 and has an inclination corresponding to the inclination of the support surface 23 in the extended support region 19. From the support part 25 an elongate slot engagement part 31 extends axially at the inner side of the lowering sleeve 15 in the direction of the positioning nut 17. The elongate slot engaging part 31 has essentially the width of the elongate slot 18 and slidingly engages in the latter so that the lateral edges 22 of the elongate slot 18 permit a displacement of the rotary latch 21 in the direction of the central axis 30 not however in the circumferential direction of the sleeve 15.

As seen in FIGS. 2 to 4 a limb 43 which extends radially to the lowering sleeve 15 adjoins the bottom of the elongate slot engagement part 31 and has an upper clamping surface 29 which clampingly engages a lower counter clamping surface 28 of the lowering sleeve 15 in the position of FIGS. 1 to 4.

As seen in FIG. 4 the slide surface 27 at the lower end of the support part 25 drops away somewhat radially towards the outside in just the same manner as the counter support surface 23, so that when loading the support part 25 through the latch bolt 13 the rotary latch 21 is pressed radially outwardly against the lowering sleeve 15.

In accordance with the invention the angle α in FIG. 2 between the extended support region 19 and the counter clamping surface 28 is so selected that, in conjunction with the corresponding wedge shaped slide surfaces 27 and the clamping surfaces 29 of the rotary latch 21, a firm clamping is achieved between the rotary latch 21 and the lowering sleeve 15 on loading the rotary latch 21 in the direction of the arrow F in FIGS. 1 and 3. The relative wedge angle between the surfaces 23, 27 on the one hand and the surfaces 28, 29 on the other hand lies at approximately 4.5 degrees.

Furthermore, it is important for the operation of the device that the angle α of FIG. 2 is not substantially larger than about 7.5 degrees so that when the clamping effect achieved by the described wedge action is cancelled, self-locking is still present between the support part 25 and the support surface 23, in the sense that the rotary latch 21 does not automatically move along the longitudinal direction of the support surface 23 on being loaded by the latch bolt 13. This movement must on the contrary be initiated starting from the position of FIGS. 1 to 4 in that hammer-blows are exerted on the radial projections 52 in the sense of releasing the wedge connection (arrow f in FIG. 2).

In the circumferential direction a helical region 26 (FIGS. 2, 3) which drops away more steeply adjoins the extended support region 19 at a small distance. The pitch of this region is so dimensioned that self-locking is no longer present here between the support part 25 and the support surface 23. Thus, when the support part 25 has once reached the region 26 the lowering sleeve 15 can be turned further as a result of the weight force which the inner tube exerts on the support part 25 via the latch bolt 13. During this the latch bolt 21 with the support part 25 enters into the lowered support region 20 shown in FIGS. 2 and 3 where the support 25 abuts against the axially extending step 56 which is present between the end of the one support surface and the start of the next support surface.

A restriction surface 36 adjoins the counter-clamping surface 28 in the circumferential direction as seen in FIGS. 2 and 3 and the limb 43 engages beneath this boundary surface While being spaced therefrom, so that the boundary surface 27 merely exerts a safety function in the sense that the rotary latch 21 can only be axially removed by a restricted amount from the support surface 23. The limb 43 merely engages the counter clamping surface 28 in the extended position of the rotary latch 21.

The operation of the described telescopic support is as follows.

First of all the positioning nut 17 together with the lowering sleeve 15 which has been mounted thereon is screwed onto the thread 16 of the outer tube 11 sufficiently far that a substantial region of the elongate slots 18 is located above the support surfaces 23 of the lowering sleeve 15. The rotary latches 21 are now introduced into the elongate slots 18 from above and are brought into the position of FIGS. 2 and 3. If now the inner tube 12 is pushed into the outer tube 11 then the rotary latches 21 are secured in their position at the lowering sleeve 15 and also within the elongate slots 18. The lower end of the inner tube 12 should be provided in accordance with FIG. 1 with outwardly directed projections 57 which prevent full extraction of the inner tube 12 out of the outer tube 11. The counter projections 58 at the inner side on the outer tube should be located approximately in the region of the lower end of the outer thread 16, so that in each case adequate overlap is ensured between the inner and outer tubes, and thus the rotary latch 21 is secured in each extracted position of the inner tube against dropping out towards the inner side.

The telescopic support is capable of operating once the foot plate 48 and ceiling plate 49 have been mounted, which can be done before or after the inner or outer tubes have been assembled in the above described manner.

The actual spacing of the carrying cutouts 14 should be somewhat less than the length of the elongate slots 18 in order to enable a stepless free coarse and fine adjustment of the length of the telescopic support 24.

The telescopic support is now ready for use.

If a predetermined precise length of the telescopic support 24 is selected then the positioning nut 17 is first rotated into its lowermost position on the outer thread 16, so that the major part of the elongate slots 18 lies free above the lowering sleeve 15.

The inner tube 12 is now drawn out of the outer tube 11 sufficiently far that the required length is coarsely selected. The latch bolt 13 is now pushed transverse to the central axis 13 through the cut-out 14 which is aligned with the upper part of the elongate slots 18. Prior to this the lowering sleeve 15 has however been brought into the extended position shown in FIG. 2 by turning the lowering sleeve 15 until the clamping between the rotary latches 21 and the lowering sleeve 15 starts to become effective in the region of the extension support region 19. The final clamping and positioning of FIG. 2 is then effected by hammer-blows on one of the projections 52 opposite to the direction of the arrow f.

After the insertion of the latch bolt 13 the latter sinks onto the support part 25 whereby the coarse adjustment of the length of the telescope support 24 has now been effected.

The clamping of the rotary latches 21 is also first possible after the insertion of the latch bolt 13.

Following this the positioning nut 17 is then turned in the extension direction until the telescope support 24 has the correct length. If the positioning nut 17 is first unintentionally turned too far then it can also be turned back again without problem without the danger of delatching occurring between the lowering sleeve 15 and the outer tube 11.

After adjusting the correct length of the telescope support 14 the shuttering 39 can then be arranged at the envisaged distance from the support surface 40 (FIG. 1) and concreting can take place.

After the concrete has set and the shuttering is to be removed it is only necessary to release the clamping between the rotary latches 21 and the lowering sleeve 15 by hammer-blows in the direction of the arrow f in FIG. 2. On doing this the regions 26 of the support surface 23 enter into the region of the support part 25 for the rotary latches 21, whereupon the lowering sleeve 15 is automatically turned on further as result of the weight of the inner tube 12 until the support 25 is located in the lower support region 20. In this way the inner tube 11 is rapidly lowered without problem by an amount of for example 3 cm which is necessary for the removal of the telescopic support 24 from the deck shuttering 39. For this purpose it is not necessary to screw the positioning nut 17 downwardly on the outer thread 16. The positioning nut 17 can however be turned back further after rapid lowering has taken place, which is possible without great effort in the absence of the pressure from the deck shuttering.

It will be understood that the screw track of the support surface 23 is made substantially steeper than the outer thread 16. Whereas the outer thread 16 is clearly inclined beneath the range for self-locking it is important for the screw track of the support surface 23 that no self-locking is present within the major part of the circumference.

In the following embodiments the same reference numerals are used to designate parts which are constructionally and functionally equivalent to parts shown in the embodiment of FIGS. 1 to 4.

In the embodiment of FIGS. 5 to 7d a stub-like and radially inwardly projecting bolt latch 13' with a preferably rounded head is integrated into each of the two diametrically oppositely disposed rotary latches 21'. Moreover, the rotary latches 21' are formed as slide shoes which, in accordance with FIG. 7, are arranged within an internal groove 34 of the lowering sleeve 15 in analogous manner to the rotary latches 21 of FIGS. 1 to 4. As result of the constructional unification of the rotary latches 21' with the latch bolts 13' provision must however be additionally made to the embodiment of FIGS. 1 to 4, that the latch bolts 13' can be brought out of engagement with the carrier recesses 14, 14'. This takes place in detail in the following manner which will be explained with reference to FIGS. 5 to 7d.

The rotary latches 21, of FIGS. 5 and 6 and also 7a to 7d are formed so that they are substantially of circular sector-like shape, with the circular sectors being essentially axially tangential to the outer wall of the inner tube 12 and with their centre of curvature and also their radius of curvature lying outside of the inner tube 12.

The peripheral groove 34 extends over a somewhat smaller angle than 180 degrees along a lowering angular range 32 (FIG. 7) and then merges in to an angular release region 33.

The rotary latches 21' in accordance with FIGS. 7, 7a are located within the angular lowering region 32, first of all within the extended support region 19 where they are so clamped between the support surface 23 and the counter support surface 28 that a relatively firm connection is present here in the circumferential direction between the rotary latches 21' and the lowering sleeve 15. In the axial direction the rotary latches 21' hereby adopt the position evident from FIGS. 5 and 7a (VIIa in FIG. 7) in which the latch bolts 13' are located in engagement with the carrying recesses 14 and 14' of the inner tube 12.

For the purpose of rapid lowering the lowering sleeve 15 is again moved by hammer-blows in the circumferential direction such that the rotary latches 21' of FIG. 7 reach the non-self-locking region 26 of the screw track-like support surface 23, whereupon the lowering sleeve 15 automatically turns on further under the weight of the inner tube 12 until finally the rotary latches 21' are located in the lowermost position (VIIb in FIG. 7, i.e. in the retraction support region,) 20 on the support surface 23, which is also reproduced in FIG. 7b.

There, an abutment 35 (FIG. 7) initially restricts further turning of the lowering sleeve 15. Above the rotary latches 21 there is however adequate free space in this lowered position for a movement of the rotary latches 21' upwardly.

The abutment step 35 is adjoined in the circumferential direction within the angular release region 33 by a relatively steeply rising region 23' of the support surface 23. The rotary latches 21' can only reach this region when the inner tube 12 is grasped above the outer tube 11 and is lifted somewhat while rotating the lowering sleeve 15. By further lifting and turning the rotary latches 21' finally pass in accordance with FIGS. 7 and 7c into axial alignment (position VIIc in FIG. 7) with outwardly curved slots 36 which are provided above the rising region 23, and which are bounded at the sides by tongues 46 which cooperate with lateral grooves 47 in the side surfaces of the rotary latches 21', when the rotary latches 21' are lifted out of the position of FIG. 7c into that of FIG. 7d, with the grooves being curved in accordance with the rotary latches 21'.

By lifting of the inner tube 12 when the rotary latches (FIG. 7c) are aligned with the slots 36 the rotary latches 21' which are guided in accordance with their curvature finally slide into the position shown in FIGS. 6 and 7d (VIId FIG. 7) in which the latch bolts 13 are located out of engagement with the carrier recesses 14 and 14' respectively of the inner tube 12. The inner tube 12 can now be extracted until the next carrier recess 14 or 14' comes into alignment with the latch bolts 13' whereby the latch bolts 13' again automatically drop into the carrier recesses 14.

If a carrier recess 14 located above it is to be brought into engagement with the latch bolt 13' then the inner tube 12 is first turned somewhat out of the position of FIG. 6 or 7d so that the carrier recesses 14 are axially no longer aligned with the latch bolts 13'. The support tube 12 can now be lowered without the danger existing that the latch bolts 13' drop into the lowered carrier recesses 14. Only when the inner tube 12 is turned back again, and the carrier recesses 14 are brought radially into alignment with the latch bolts 13', can the latch bolts 13' drop back into the carrier recesses 14, automatically as result of the weight force acting on the latch bolts 21'.

In order to avoid the latch bolts 21' dropping out of the arcuate guide formed by the tongues 46 the lateral guide grooves 47 are bounded at the bottom by end abutments 38 which finally abut against the tongues 46 when the rotary latches are in the position of FIGS. 6 and 7d. The rotary latches 21' are thus non-loosably retained on the lowering sleeve 15, in so far as the inner tube 12 is pushed into the outer tube 11, which is normally the case.

42 designates in the figures the direction perpendicular to the central axis 30 in which the relative movement takes place between the cover sleeve 15 and the rotary latches 21'.

Of importance here is also the projection 59 which projects from the restriction surface 37 in the region of the tongues 46 somewhat towards the groove 34 and which on axially lifting the inner tube 12 out of the position where the rotary latches 21' are located on the lowering support region 20, prevents the rotary latches 21, turning and sliding on their own into the slots 36 following the abutment of the rotary latches 21' against the restriction surface 37. This should only be possible with an intentional combined rotary lifting movement from the position VIIb into the position VIIc in FIG. 7.

The arrangement of the rotary latches 21' shown at the extreme right in FIG. 7 and 7d shows the displaced axially by the largest amount where the abutments 38 come into engagement with the lower ends of the tongues 46.

Whereas, during lifting of the rotary latches 21' out of the position VIIb shown second in FIG. 7, the radial arrangement of the rotary latches 21' and of the latch bolts 13' corresponds to the position of FIG. 5 (see also FIG. 7a to 7c), in the same way as on a movement between the regions 19 and 20, on upward movement of the rotary latches 21' on the rising region 23' the arcuate outward pivoting of the rotary latches 21' takes place of other position of FIG. 5 or 7c into the position of FIG. 6 or 7d respectively. The rotary latches 21' and the latch bolts 13' thus merely change their axial position within the regions 19, 20, 26. On the transition from the position of FIG. 7c into the position of FIG. 7d they additionally change their radial position in the sense that the latch bolts 13' come out of engagement with the carrier recesses 14 and 14' respectively.

FIGS. 8 and 10 show at 14 carrier recesses in the form of throughgoing bores such as are necessary for the use of a latch bolt 13 formed as a long pin in accordance with FIGS. 1 to 4. If, however only latch bolts 13' in the form of stub bolts are used in accordance with FIGS. 5 to 7 then it is sufficient when the carrier recesses have the form of depressions 14' in accordance with FIGS. 8 and 9.

I claim:

1. A telescopic support having an adjustable length for supporting shuttering at a defined distance from a fixed support surface, the telescopic support comprising:

an elongated outer tube having a threaded outer surface and an axially elongated slot defined therein;

an elongated inner tube slidably disposed within said outer tube and having carrier recesses distributed over the length of said inner tube;

a lowering sleeve disposed around said outer tube, said lower sleeve having a support surface comprising an extended support region, a lowered support region, and an intermediate support region connecting said extended and lowered support regions;

a positioning nut having a threaded inner surface adapted to engage the threaded outer surface of said outer tube, said positioning nut adapted to maintain said lowering sleeve in a substantially fixed axial position relative to said outer rube;

a latch bolt disposed in said elongated slot of said outer tube, said latch bolt having a first end adapted to engage one of said carrier recesses and a second end adapted to engage said support surface of said lowering sleeve, said latch bolt adapted to move axially within said elongated slot in response to rotation of said support surface of said lowering sleeve; and a rotary latch disposed in said elongated slot of said outer tube, said rotary latch adapted to engage said lowering sleeve and to prevent rotation of said lowering sleeve relative to said outer tube when said second end of said latch bolt engages said extended support region.

2. A telescopic support in accordance with claim 1 wherein said rotary latch is substantially movable in a circumferential direction relative to said outer tube, said latch being fixedly connected to the lowering sleeve when said latch bolt engages said extended support region of said lowering sleeve.

3. A telescopic support in accordance with claim 2 wherein said rotary latch is clampable with the lowering sleeve by displacement in essentially the circumferential direction into the extended support region.

4. A telescopic support in accordance with claim 2 wherein said support surface comprises a screw-like support surface extending concentrically to the central of the outer tube, whereby said inner tube moves relative to the outer tube in the axial direction in response to rotation of said lowering sleeve.

5. A telescopic support in accordance with claim 4 wherein the outer tube further comprises:
 a second axial elongated slot defined in said threaded surface of said outer tube, said axial elongated slot and said second axial elongated slot being diametrically oppositely disposed;
 a second latch bolt disposed in said second axial elongated slot; and
 a second support surface, said support surface and said second support being formed as screw tracks on the lowering sleeve and extending behind one another in the circumferential direction on said lowering sleeve.

6. A telescopic support in accordance with claim 1 wherein said rotary latch comprises:
 a support part having a lower surface adapted to contact the support surface of the lowering sleeve and an upper surface adapted to support said latch bolt, said support part being disposed between the latch bolt and the support surface,
 whereby said latch bolt is supported on the support surface by the support part, said lower surface of said support part having a slide surface adapted to slide on the support surface in the circumferential direction.

7. A telescopic support in accordance with claim 1 wherein said latch bolt is braced in an extended position in self-locking manner on the support surface of said lowering sleeve.

8. A telescopic support in accordance with claim 7 wherein said extended support region of said support surface merges in the peripheral direction into a steep region, wherein said steep region is not self-locking.

9. A telescopic support in accordance with claim 6 wherein said rotary latch further comprises a clamping surface disposed adjacent said extended support region, wherein said clamping surface bears on a counter clamping surface disposed on the lowering sleeve in opposite axial direction as said lower surface of said support part.

10. A telescopic support in accordance with claim 9 wherein the extended support region of said support surface is disposed at an angle relative to said counter-clamping surface of the lowering sleeve, wherein said angle converges in the direction of said lowered supported region, the angle being in the range between 2 and 6 degrees.

11. A telescopic support in accordance with claim 7 wherein the extended support region of said support surface of the lowering sleeve is disposed at an inclination angle relative to a perpendicular to a central axis of said inner member in the range between 5 and 10 degrees.

12. A telescopic support in accordance with claim 10 wherein said extended support region of the clamping surface and the counter-clamping surface are disposed at an inclination angle relative to a perpendicular to a central axis of said inner tube in the range between 1 to 5 degrees.

13. A telescopic support in accordance with claim 1 wherein said rotary latch has a U-shaped cross section comprising first and second limb portions and a web portion connecting said first and second limb portions, the first limb forming a first support part, the web forming a support part adapted to engage the elongated slot and the second limb forming the clamping surface.

14. A telescopic support in accordance with claim 1 wherein said rotary latch is formed as a slide shoe disposed in a groove, said groove formed in the inner surface of the lowering sleeve, said groove having a lower edge forming the support surface and an upper edge forming the counter clamping surface.

15. A telescopic support in accordance with claim 2 wherein said latch bolt and said rotary latch are integrally connected, said latch bolt extending radially away from the rotary latch to engage one of said carrier recesses of the inner tube.

16. A telescopic support in accordance with claim 15 wherein said rotary latch is adapted to move away from the inner tube to disengage said latch bolt from said carrier recess of the inner tube.

17. A telescopic support in accordance with claim 15 wherein the movement of the rotary latch away from the support surface is restricted by a restriction surface having the same shape as said support surface, wherein said restriction surface is connected to the counter clamping surface.

18. A telescopic support in accordance with claim 17 wherein said support surface of said lowering sleeve further comprises an angular release region connected to said lowered support region, wherein the angular release region is adapted to allow the rotary latch to disengage from said carrier recesses in response to axial movement of said inner tube in the direction of extraction movement.

19. A telescopic support in accordance with claim 18 wherein said lowered support region of said support surface and said angular release region are connected by a short rising region, wherein is displaced upwardly and the latch bolt is simultaneously displaced radially outwardly in said short rising region.

20. A telescopic support in accordance with claim 19 wherein said support surface of said lowering sleeve further comprises an abutment step disposed between said lowered support region and said rising region.

21. A telescopic support in accordance with claim 14 wherein said rotary latch is outwardly curved and is guided by said lowering sleeve from a lock position to a relapse position in an axial and radial direction whereby said latch bolt engages one of said carrier recesses in said lock position and is disengaged with the inner tube in said release position.

22. A telescopic support in accordance with claim 21 wherein said axial direction of movement of the rotary latch is restricted by abutments disposed on said lower sleeve.

23. A telescopic support in accordance with claim 15 wherein said carrier recesses defined in the inner tube are depressions.

24. A telescopic support in accordance with claim 1 further comprising:
 a second axial elongated slot defined in said outer tube, said second axial elongated slot being disposed opposite said axial elongated slot, and a second rotary latch disposed in said second axial elongated slot.

25. A telescopic support in accordance with claim 4 wherein said axial movement has a maximum extent from 2 to 5 cm.

26. A telescopic support in accordance with claim 4 wherein said axial movement has an maximum extent of approximately 3 cm.

27. A telescopic support in accordance with claim 10 wherein said angle is in the range between 3 and 5 degrees.

28. A telescopic support in accordance with claim 10 wherein said angle is 4 degrees.

29. A telescopic support in accordance with claim 11 wherein said inclination angle is in the range between 7 and 8 degrees.

30. A telescopic support in accordance with claim 11 wherein said inclination angle is 7.5 degrees.

31. A telescopic support in accordance with claim 10 wherein said inclination angle is in the range between 2 and 4 degrees.

32. A telescopic support in accordance with claim 10 wherein said inclination angle is in the range between 2.5 and 3.5 degrees.

33. A telescopic support in accordance with claim 14 wherein said groove further comprises a restriction surface adjoining said lower edge and said upper edge in a circumferential direction, said restriction surface restricting the movement of the rotary latch in the axial direction away from the support surface.

* * * * *